United States Patent [19]

Mochida et al.

[11] 4,365,488
[45] Dec. 28, 1982

[54] UNIVERSAL JOINT

[75] Inventors: Haruo Mochida; Yoshiyuki Tanaka, both of Yokohama; Yoshio Yamamoto, Kosai; Minoru Kataoka, Shizuoka, all of Japan

[73] Assignees: Nissan Motor Co., Ltd.; Fuji Kiko Company, Limited, both of Japan

[21] Appl. No.: 145,154

[22] Filed: Apr. 30, 1980

[30] Foreign Application Priority Data

May 11, 1979 [JP] Japan .............. 54-63193[U]

[51] Int. Cl.³ .............................. F16D 3/26
[52] U.S. Cl. ..................... 464/132; 403/57; 464/134
[58] Field of Search .............. 403/57; 64/17 R, 17 A, 64/17 SP

[56] References Cited

U.S. PATENT DOCUMENTS

| 848,652 | 4/1907 | Hughes | 64/17 R |
|---|---|---|---|
| 1,225,199 | 5/1917 | Williams | 64/17 R |
| 1,826,611 | 10/1931 | Furgason | 64/17 R |
| 2,439,569 | 4/1948 | Hathorn | 64/17 A |
| 2,921,450 | 1/1960 | Klomp | 64/17 A |

FOREIGN PATENT DOCUMENTS 1267235 6/1961 France ..................... 64/17 R

Primary Examiner—Andrew V. Kundrat
Attorney, Agent, or Firm—Thompson, Birch, Gauthier & Samuels

[57] ABSTRACT

A universal joint is composed of first and second yokes each having two through holes, a hollow rectangular parallelepiped support member positioned to cooperate with the first and second yokes, the support member having five rectangular plate sections leaving a rectangular opening, and formed with four through holes, the adjacent rectangular plate sections being completely integral with each other at connecting edges thereof, and pins insertable into the through holes of the yokes and of the support member so as to connect the yokes with the support member, thereby producing a universal joint light in weight and high in torsional strength.

5 Claims, 7 Drawing Figures

UNIVERSAL JOINT

This invention relates to a universal joint which is suitable for use, for example, in a steering linkage of a vehicle between a steering wheel and steerable road wheels, or in a gear shift control line of the vehicle between a gear shift control lever and a transmission.

A main object of the present invention is to provide an improved universal joint, which can efficiently transmit rotational movement from a drive axis to a driven axis without any significant drawbacks.

Another object of the present invention is to provide an improved universal joint, which is light in weight and high in torsional strength as compared with conventional universal joints.

A further object of the present invention is to provide an improved universal joint, which is simple in construction and low in cost as compared with conventional universal joints.

A further object of the present invention is to provide an improved universal joint, which uses a central spider member through which a yoke provided with a drive axis is operatively connected to a second yoke providing a driven axis, the spider member comprising a pin support member of the shape of a hollow rectangular parallelepiped.

Other objects, features and advantages of the improved universal joint in accordance with the present invention will become apparent from the following description when taken in conjunction with the accompanying drawings wherein like reference numerals designate like parts and elements throughout all embodiments of the present invention, in which.

In connection with universal joints which are generally disposed between two shafts whose axes are coplanar but not coinciding so as to efficiently transmit rotation from one axis to another, various joints have been proposed and used. Of these, universal joints employing pins are much used because of simple construction and low cost as compared with other kinds of universal joints. Two examples of such universal joints as have been already proposed will be illustrated with reference to FIGS. 1 and 2, in which central spider members 1 and 1A are used.

Figure 1:
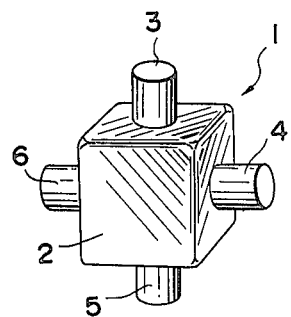
FIG. 1 is a perspective view of a spider member of a conventional universal joint.

The central spider member 1 shown in FIG. 1 comprises a solid block 2 in the shape of a rectangular parallelepiped which is provided at its four flat surfaces with four pins 3, 4, 5 and 6, respectively. A yoke will be rotatably mounted on the opposite two pins 3 and 5 through, for example, bearings (not shown). Similarly another yoke will be rotatably mounted on the other opposite pins 4 and 6.

Figure 2:
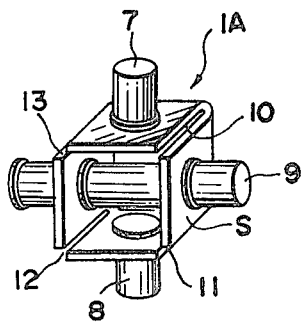
FIG. 2 is a perspective view of a spider member of another conventional universal joint.

The central spider member 1A shown in FIG. 2 comprises a support member S in the shape of a hollow rectangular parallelepiped which is formed by bending a flat metal sheet in the shape of a cross. Two pins 7 and 8 are inserted through two opposite holes formed in two opposite plate sections. A long pin 9 is inserted through the two remaining holes. Additionally, a yoke will be rotatably mounted on the pins 7 and 8, and another yoke will be rotatably mounted on both end sections of the long pin 9.

Such universal joints using the central spider members 1 or 1A have encountered the following difficulties: the universal joint shown in FIG. 1 is considerably heavier because of the solid block 2. The universal joint shown in FIG. 2 is formed with slits 10, 11, 12 and 13 at its four edges resulting in low torsional strength.

In view of the above, the present invention contemplates overcoming the difficulties encountered in the universal joints using central spider members as shown in FIGS. 1 and 2, by employing an improved pin support member forming part of a central spider member with which yokes provided with drive and driven axes are connected, the improved pin support member being the shape of a hollow rectangular parallelepiped.

Figure 3:
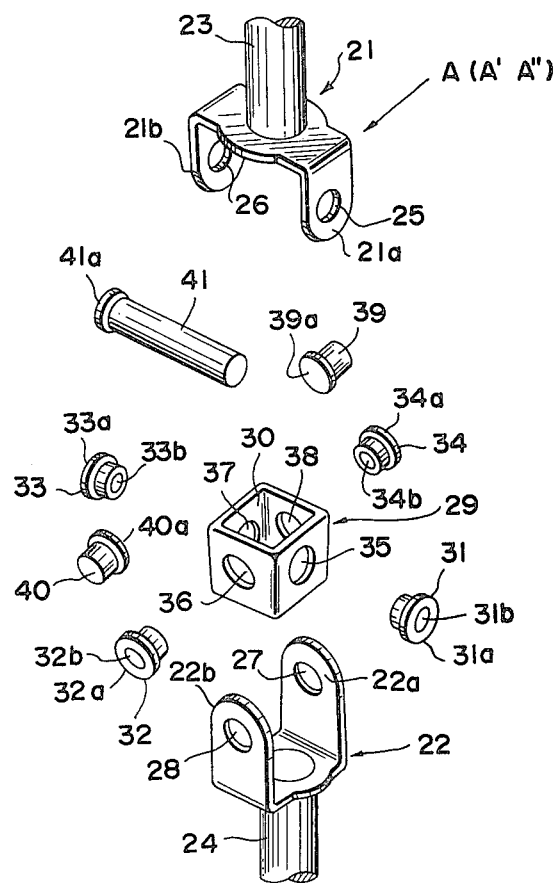
FIG. 3 is an exploded view showing the general construction of a universal joint in accordance with the present invention.
Figure 4:
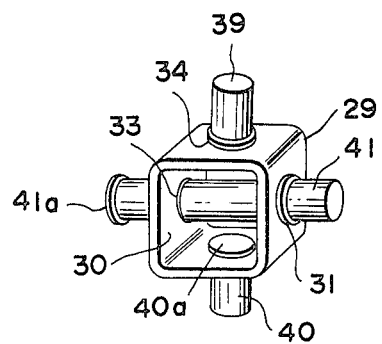
FIG. 4 is a perspective view showing the general construction of a spider member of a universal joint in accordance with the present invention.
Figure 5:
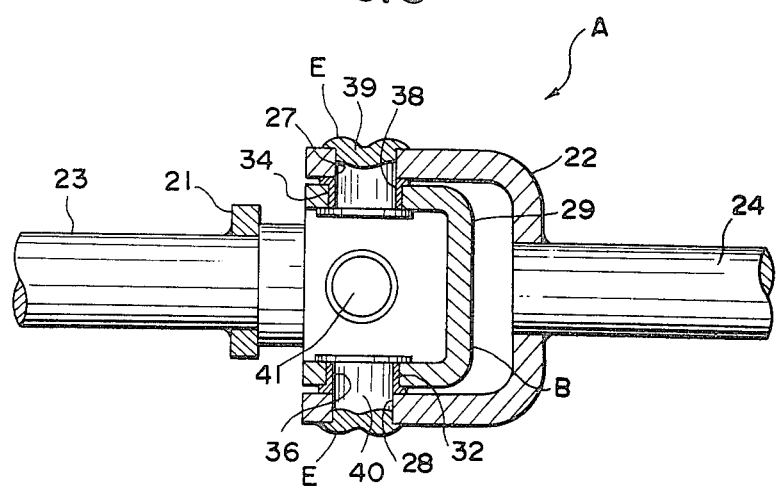
FIG. 5 is a cross-sectional view of an embodiment of the universal joint in accordance with the present invention.

Referring now to FIGS. 3, 4 and 5 of the drawings, there is shown an embodiment of a universal joint A in accordance with the present invention, in which the arrangement of FIGS. 3 and 4 are common throughout all embodiments of the present invention hereinafter described. The universal joint A is composed of generally opposite first and second yokes or "U"-shaped members 21 and 22. The first yoke 21 is provided at its central portion with a shaft 23, and opposite side plate sections 21a, 21b with through holes 25 and 26, respectively. Likewise, the second yoke 22 is provided at its central section with a shaft 24, and at its opposite side sections 22a and 22b with two circular through holes 27 and 28, respectively.

A support member 29 forming part of a central spider member shown in FIG. 4 is located to be surrounded by the plate sections 21a, 21b of the first yoke 21 and the elongate plate sections 22a and 22b of the second yoke 22. The support member 29 is constructed by pressing a steel plate into the shape of a box, or constructed by press-molding or injection-molding plastic into the same shape. It is to be noted that the support member 29 is of the shape of hollow rectangular parallelepiped having five flat rectangular surface sections and a rectangular opening 30. Two opposite parallel plate-like sections of the support member 29 are respectively formed with circular through holes 35 and 37; the other two opposite parallel plate-like sections are respectively formed with circular through holes 36 and 38, the axes of each of the holes defining a plane. A bottom plate-like section B shown in FIG. 5 is integrally formed with each of the abovementioned parallel plate-like sections to form a solid, unitary support member having no slits as the device of FIG. 2, which slits reduce the torsional strength of the member.

Four metal bushings 31, 32, 33 and 34 are provided to be insertable into the through holes 35, 36, 37 and 38, respectively, inwardly toward the center of the support member 29. Each bushing is formed with a flange section 31a, 32a, 33a or 34a and with a cylindrical opening 31b, 32b, 33b or 34b as shown in FIG. 3. It will be understood that the flange section of each bushing is larger in diameter than the through holes 35, 36, 37 or 38.

Two short pins 39 and 40 of other suitable pin means are provided as to be insertable into respective cylindrical openings 32b and 34b of the bushings 32 and 34 and also through holes 27 and 28 of respective yoke plate sections 22a and 22b. The pins 39 and 40 are formed with flange sections 39a and 40a, respectively, each being larger in diameter than the circular through holes 38 and 36, respectively. It is to be noted that an end of the thus inserted short pin, opposite to the end provided with the flange section, is deformed to form an enlarged head section E as shown in FIG. 5 in order to prevent the inserted pin 39 or 40 from coming out from the circular through holes 37 or 28 of the yoke 22. The enlarged head section E may be formed by pressing or staking the end of the pin 39 or 40. Also preventing the inserted pin from coming out is achieved by installing a stop ring along a ring groove (not shown) formed at the peripheral surface of the end of the pin.

A long pin 41 is inserted into the circular through holes 25 and 26 of the yoke 21, passing through the cylindrical openings 31b and 33b of the bushings 31 and 33 which have been disposed in the circular through holes 35 and 37, respectively. The long pin 41 is formed with a flange section 41a which is larger in diameter than the circular through holes 35 and 37. It will be understood that an end of the long pin 41, opposite the end provided with the flange section, is provided with means for retaining the pin in the circular through hole 25 of the yoke 21, identical to the means employed in the short pins 39 and 40.

The universal joint A of the present invention will be assembled as follows: bushings 31, 32, 33, and 34 are press-fitted into the through holes 35, 36, 37 and 38 of the support member 29 from the outside thereof. Then, the support member 29 is positioned between the plate sections 22a and 22b of the yoke 22. It is advantageous for inserting the pins 39 and 40 to locate the rectangular opening 30 of the support member away from the yoke rod 24 in order to provide easy access to the interior of the support member 29. The yoke 22 is so located that the through holes 27 and 28 are aligned with the opposite two cylindrical openings 34b and 32b of the bushings 34 and 32, respectively. Thereafter, the short pins 39 and 40 are inserted into the openings 34b and 32b, respectively, from the inside of the support member 29, and then the end sections thereof are provided with means for retaining the pins in position.

The yoke 21 is positioned so that the support member 29 is located between the plate sections 21a and 21b and so that the through holes 25 and 26 of the yoke 21 are aligned with the two cylindrical openings 31b and 33b of the bushings 31 and 33. Thereafter, the long pin 41 is inserted into the through holes 26 and 25 of the yoke 21, passing through the cylindrical openings 33b and 31b of the bushings 33 and 31. The end section of the long pin 41 projecting from the through hole 25 is then provided with means for retaining the pin in position, similar to that of the short pins 39 and 40.

It will be appreciated from the above, that according to the embodiment of FIGS. 3, 4 and 5, the bushings 31, 32, 33 and 34 are press-fitted into the through holes 35, 36, 37 and 38 of the support member 29, so that the pins 39, 40 and 41 are received in the cylindrical openings of the bushings. By virtue of this arrangement, the pins 39 and 40 are deformed to increase their diameters and also be attached to the yokes during formation of the enlarged head section E shown in FIG. 5, thus improving the operational and production efficiency of the universal joint.

Figure 6:
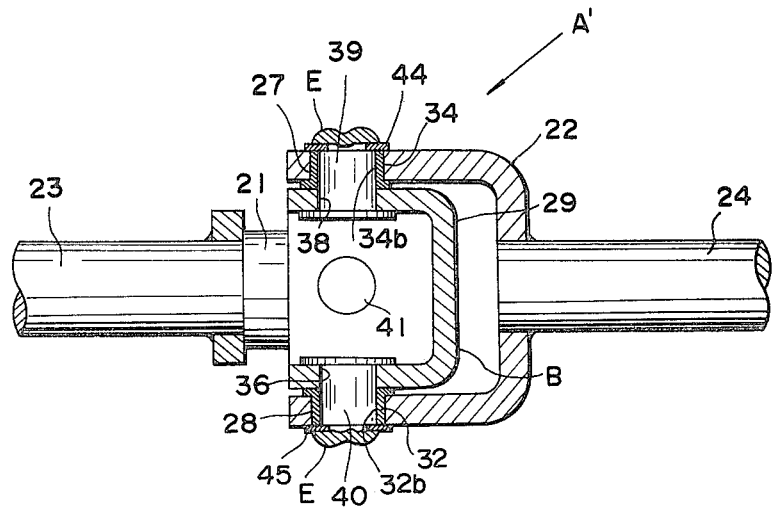
FIG. 6 is a cross-sectional view similar to FIG. 5, showing another embodiment of the universal joint in accordance with present invention.

FIG. 6 shows another embodiment of the universal joint A' according to the present invention, which is similar to the construction of FIG. 5 except for the location of the bushings. This will be explained in detail also with reference to FIGS. 3 and 4 which are common also to this embodiment. The bushings 31, 33, 34 and 32 are press-fitted into the through holes 25, 26, 27 and 28 of the first and second yokes 21 and 22. The pins 39 and 40 are inserted through the through holes 38 and 36 of the support member 29 into the cylindrical openings 34b and 32b of respective bushings 34 and 32. The pin 41 is inserted into the cylindrical openings 33b and 31b of the bushings 33 and 31, passing through the through holes 37 and 35 of the support member 29. Of course, in this particular embodiment, the relative sizes of support member holes 35, 36, 37 and 38 and yoke member holes 25, 26, 27 and 28 are reversed.

In this case, each pin 39, 40 or 41 is formed at its smaller end with a section which is still smaller in diameter than the main section of the pin. The pins 39, 40 and 41 are provided at their small diameter sections with washers 44, 45 and 46 respectively as shown in FIG. 6. With respective washers 44, 45 and 46 in position as shown, the ends of the pins are then welded, staked or otherwise retained in place in a customary manner. It will be understood that a washer is not necessary between the flange section 41a of the long pin 41 and the surface of the elongate plate section 21b of the first yoke 21.

With the thus arranged universal joint A', the bushings 31, 32, 33 and 34 are positioned radially outwardly from the axis of the union of rods 23 and 24, as compared with a universal joint in which the bushings are disposed inwardly toward such axis union. This will improve the tortional strength of the universal joint A', because a higher torsional stress is applied to a position further from the axis union of the universal joint.

Figure 7:
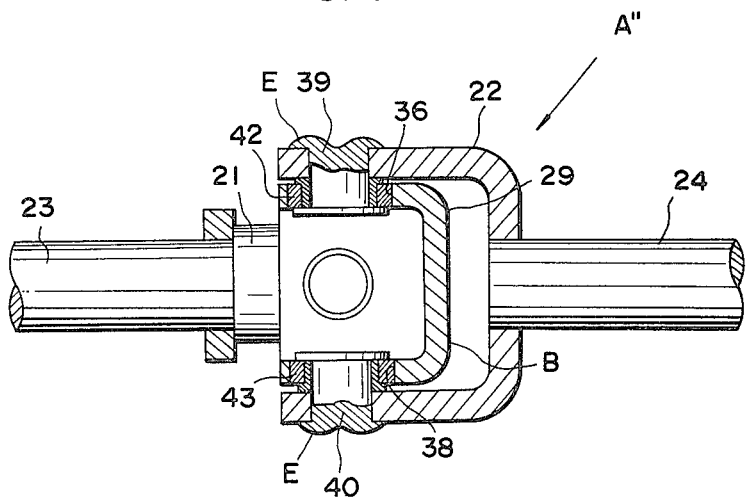
FIG. 7 is a cross-sectional view similar to FIG. 5, showing a further embodiment of the universal joint in accordance with present invention.

FIG. 7 shows a further embodiment of the universal joint A" according to the present invention, which is similar to that of FIG. 5 with the exception that resilient elastic cylindrical members 42 and 43 made of rubber or plastic are press-fitted into at least two opposite through holes 36 and 38 of the support member 29. Of course, each resilient cylindrical member may be adhered to the surface of the through hole or otherwise formed therewith. As shown, each resilient cylindrical member 42, 43 is securely disposed within the through hole of the support member 29 and between the flange surface of the bushing and the respective pin flange sections. This arrangement absorbs transmission noise and vibration, improving smooth transfer of rotation from a drive axis to a driven axis. In this embodiment, it is preferable that each of the flange sections 31a, 32a, 33a and 34a of the bushings 31, 32, 33 and 34 be located between the outer surface of the support member 29 and the plate sections 21a, 21b, 22a and 22b of the first and second yokes 21 and 22. This arrangement prevents generating noise otherwise caused by the contact between the support member 29 and the two yokes 21, 22, which also decreasing frictional contacting surface area to obtain smooth rotation of the universal joint.

While metal bushings 31, 32, 33 and 34 have been shown as being used in the universal joint according to the present invention, it will be understood that the bushing may be made of plastic, hard rubber, or other similar material. Furthermore, the bushing may be replaced with ball-and-roller bearings. Additionally, although a long pin 41 and two short pins 39 and 40 have used in the above-mentioned embodiments, it will be understood that four short pins may be used in place of them.

As appreciated from the above, the universal joint shown in FIGS. 3 to 7 will exhibit the following significant effects:

(1) Since the support member forming part of the central spider member is integrally formed into a unitary hollow rectangular parallelepiped without slits at the adjoining edges thereof, it exhibits improved torsional strength while remaining light in weight.

(2) Since the bushings (with or without resilient cylindrical members) are disposed in the through holes for receiving the pins, noise generation and vibration transmission can be reduced, thereby attaining smooth transmission of rotation through the universal joint.

(3) Construction of the universal joint is relatively simple, thereby reducing the cost of the universal joint of the present invention.

What is claimed is:

1. A universal joint, comprising:
   first and second yokes, each having two side sections, each of said side sections having a hole therein;
   a hollow rectangular parallelepiped support member positioned between the side sections of said first and second yokes, said support member having five rectangular plate sections, four of said rectangular plate sections including respective holes, each of said four rectangular plate sections being integrally connected to adjacent plate sections at adjoining edges thereof;
   four bushings, one each being disposed in a respective hole of said support member, each of said bushings being formed with a cylindrical opening therethrough and an annular flange section at one end thereof, said flange sections being located between the rectangular plate sections of said support member and the side sections of said yokes; and
   pin means inserted into the respective holes of the side sections of said yokes and the bushings disposed in said support member plate sections for pivotally coupling said yokes and support member plate sections.

2. A universal joint as claimed in claim 1 wherein each of said bushings is press-fitted into one of said holes in said support member.

3. A universal joint, comprising:
   first and second yokes, each having two side sections, each of said side sections having a hole therein;
   a hollow rectangular parallelepiped support member positioned between the side sections of said first and second yokes, said support member having five rectangular plate sections, four of said rectangular plate sections including respective holes, each of said four rectangular plate sections being integrally connected to adjacent plate sections at adjoining edges thereof;
   four bushings, one each being disposed in a respective hole of said support member, each of said bushings being formed with a cylindrical opening therethrough;
   four annular resilient members, one each being disposed within a respective support member hole and about a respective bushing; and
   pin means inserted into the respective holes of the side sections of said yokes and the bushings disposed in said support member plate sections for pivotally coupling said yoke and support member plate sections.

4. A universal joint as claimed in claim 1 or 3, wherein said support member is formed by pressing a metal plate into the shape of a rectangular parallelepiped.

5. A universal joint as claimed in claim 1 or 3, wherein said support member is formed by molding plastic material into the shape of a rectangular parallelepiped.

* * * * *